Figure 1:
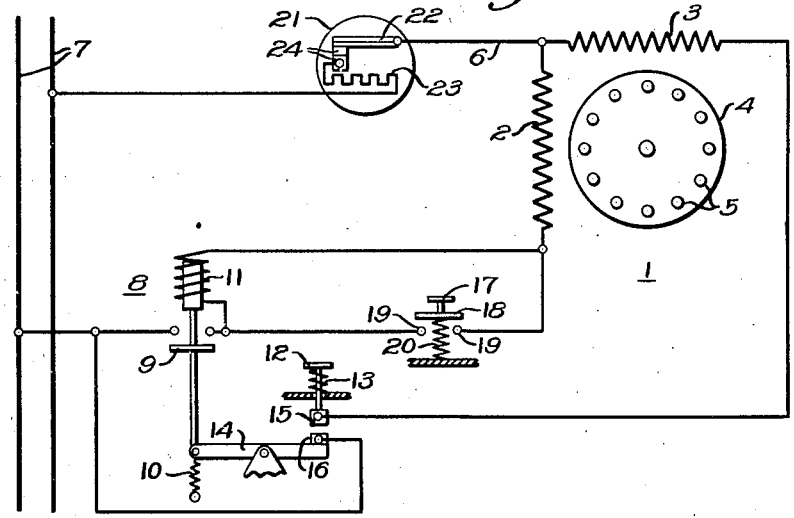

Aug. 21, 1945.  H. E. ELLIS  2,382,983

SINGLE-PHASE MOTOR CONTROL

Filed Oct. 28, 1942

WITNESSES:
Robert C. Baird
F. P. Lyle

INVENTOR
Harold E. Ellis.
BY O.B.Buchanan
ATTORNEY

Patented Aug. 21, 1945

2,382,983

UNITED STATES PATENT OFFICE 2,382,983

SINGLE-PHASE MOTOR CONTROL

Harold E. Ellis, Lima, Ohio, assignor to Westinghouse Electric Corporation, East Pittsburgh, Pa., a corporation of Pennsylvania Application October 28, 1942, Serial No. 463,627

9 Claims. (Cl. 172—279)

The present invention relates in general to the control of single-phase electric motors and, more particularly, to a simple and inexpensive means for manually starting and stopping such motors, and for providing overload protection.

There are many applications of small single-phase motors, such as in domestic appliances, in which low cost and simplicity of the control are of great importance. One element of the conventional arrangement which adds considerably to the cost of the motor and its control is the centrifugal or other type of speed-responsive switch which is usually used with single-phase motors to disconnect the starting winding when the motor has come up to speed. The present invention makes possible a substantial reduction in cost by the elimination of this switch.

It is also necessary or desirable in many applications of small motors to provide overload protection for the motor, and this is usually done by providing a thermally-responsive protective device which disconnects the motor in response to heat caused by excessive motor current, or heat received by the protective device directly from the motor as a result of some other abnormal condition. Such protective devices may be of the manually reset type, in which the circuit remains open after the protective device has operated until the device is manually reset by the operator, or they may be of the automatically reset type, in which the protective device recloses its contacts upon cooling.

In some applications of small single-phase motors, such as in washing machines, the motor is necessarily mounted in a relatively inaccessible location, and it is preferable to utilize the automatically reset type of protective device so that it can be mounted directly on the motor in order to obtain complete protection against all possible abnormal conditions. The use of the automatically reset type of protective device on washing machine motors, however, involves an element of danger, since after operation of the protective device, the motor may restart unexpectedly at a time when the user of the machine is in contact with a moving part. Thus, it would be very desirable to use an automatically reset protective device which could be mounted directly on the motor, but to control its operation from a remote point so as to prevent restarting of the motor until the controlling means has been actuated by the operator. The present invention provides a simple and effective means for accomplishing this result, and also permits the elimination of the speed-responsive switch which is usually used in single-phase motors.

The principal object of the present invention is to provide a simple and inexpensive means for manually controlling the starting and stopping of single-phase motors.

Another object of the invention is to provide a simple pushbutton type of control means for starting and stopping single-phase motors, and for providing overload protection for such motors in a novel and advantageous manner.

A further object of the invention is to provide a manually operated control means for effecting starting and stopping of single-phase motors in which no speed-responsive switch is required, thus effecting a substantial saving in cost.

A still further object of the invention is to provide a control means for single-phase motors in which no speed-responsive switch is required and which includes a thermally-responsive protective device for the motor, the control means being so arranged that the motor cannot restart after operation of the protective device until the control means is actuated by the operator.

Still another object of the invention is to provide a greatly simplified control means for starting and stopping single-phase motors in which no speed-responsive switch is required, and in which no relay or other external equipment is utilized except simple pushbutton actuated contacts.

Figure 2:
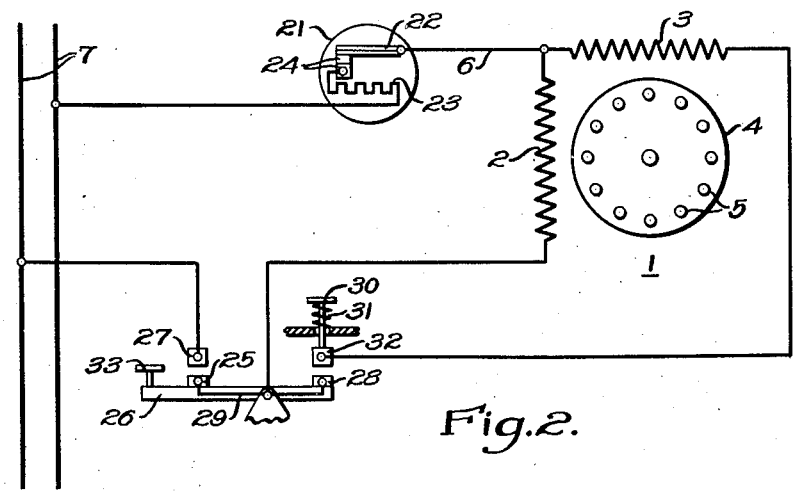

The invention will be more fully understood from the following detailed description, taken in connection with the accompanying drawing, in which:

Figure 1 is a schematic diagram showing a preferred embodiment of the invention; and Fig. 2 is a similar diagram showing a simplified embodiment of the invention.

The invention is shown in Fig. 1 as applied to a single-phase motor 1 of the split-phase type, having a main or running winding 2, and an auxiliary or starting winding 3, which are physically displaced from each other on the stator of the motor, and which are designed so that their currents are displaced in phase. It is to be understood that although the motor 1 is shown as being of the split-phase type, the invention is equally applicable to other well known types of single-phase motors, such as the capacitor-start motor in which the phase displacement between the currents in the main and starting windings is produced by means of a capacitor connected in series with the starting winding.

The motor 1 also has a rotor member 4 of any suitable type which is provided with a secondary winding shown as a squirrel-cage winding 5.

The main winding 2 and auxiliary winding 3 are connected to a common terminal 6 which is connected to one side of a single-phase supply line 7. The other end of the main winding 2 is connected to the other side of the supply line 7 by means of a contact device or relay 8. The relay 8 has a contact 9 which is connected in series between the winding 2 and the supply line 7, so that the winding 2 is connected to the line when the contact 9 is closed. The contact 9 is biased to the open position by a spring 10, or by gravity or other suitable biasing means. The relay 8 also includes a holding coil 11 which holds the contact 9 in closed position when the coil is energized. The coil 11 is connected in series between the winding 2 and the contact 9, so that when the contact has been moved to closed position to connect the winding 2 to the line, the coil 11 is also energized and maintains the contact in its closed position.

The contact 9 is mechanically moved to closed position by means of a start pushbutton 12 which is normally urged to its non-actuated position by a spring 13 or other suitable means. The pushbutton 12 is arranged so that when it is depressed it effects movement of the contact 9 to closed position, as by engaging a pivoted arm 14, or in any other suitable manner. The pushbutton 12 also carries a contact 15 which is positioned to engage a cooperating contact 16 which may be carried on the arm 14. One end of the auxiliary winding 3 is connected to the contact 15, and the contact 16 is connected to one side of the supply line 7.

In order to effect deenergization of the holding coil 11 when it is desired to stop the motor, a stop pushbutton 17 is provided. The pushbutton 17 carries a bridging contact 18 which is adapted to engage fixed contacts 19, and which is normally urged to open position by a spring 20, or other suitable means. The contacts 19 are connected directly across the holding coil 11, so that when they are bridged by the contact 18 the coil 11 is short-circuited and deenergized.

A thermally-responsive protective device 21 is connected in series with the motor terminal 6 to protect the motor against overloads or other abnormal conditions. The protective device 21 may be of the usual automatically reset type, and is shown as consisting of a bimetallic element 22 and a heating element 23. The protective device has contacts 24 which are connected in series with the motor terminal 6 so that opening of the contacts 24, in response to heating of the bimetallic element 22, interrupts the motor circuit and causes it to stop. The heating element 23 is also connected in series with the motor so as to carry the line current, and the device is arranged so that the bimetallic element 22 is subjected to the heat generated in the heating element 23. Thus, if the line current exceeds a predetermined value, the heat generated in the heating element 23 heats the bimetallic element 22 to the temperature at which it opens the contacts 24 and disconnects the motor. The protective device 21 is preferably mounted on the motor in direct heat-receiving relation to the windings so as to be heated directly by the motor, in order to afford protection against abnormal conditions which may cause excessive heating of the motor without substantially increasing the line current.

After operation of the protective device, the bimetallic element 22 begins to cool and as soon as it has cooled sufficiently it recloses the contacts 24.

The operation of this control system should now be apparent. When the motor 1 is at rest, with the parts in the positions shown in Fig. 1, and with the contacts 24 of the protective device closed, the motor is started by momentarily depressing the start pushbutton 12. When the pushbutton 12 is depressed, the contact 15 engages the contact 16, connecting the auxiliary winding 3 across the line 7, and the pivoted arm 14 moves the contact 9 into closed position, connecting the main winding 2 across the line and also energizing the holding coil 11 to maintain the contact 9 in closed position. Thus, both the main and auxiliary windings of the motor are energized substantially simultaneously and the motor starts to run. As soon as the pushbutton 12 is released, the spring 13 returns it to its non-actuated position, separating the contacts 15 and 16 so that the auxiliary winding 3 is deenergized. The holding coil 11, however, remains energized and holds the contact 9 closed, so that the motor continues to run on the main winding 2.

The auxiliary winding 3 is connected to the line substantially simultaneously with the connection of the main winding 2 and the motor starts in the same manner as in the conventional arrangement. The starting winding 3 is disconnected, however, as soon as the operator releases the pushbutton 12, thus avoiding the necessity for the relatively complicated and expensive speed-responsive switch which was used in the prior art to disconnect the starting winding when the motor reached a predetermined speed. It has been found that it is not necessary for the starting winding to be disconnected at an exact and accurately predetermined speed, but that if the operator holds the pushbutton 12 down for a time of the order of about one second, the motor will have accelerated to a sufficiently high speed so that the auxiliary winding 3 can be disconnected without causing the motor to stall, and the motor will continue to run on the main winding 2 alone.

In order to stop the motor when it is running, it is only necessary to depress the stop pushbutton 17 momentarily. This short-circuits the holding coil 11, thus deenergizing it and permitting the contact 9 to move to open position under the influence of the biasing spring 10. Opening of the contact 9 deenergizes the winding 2 and causes the motor to stop.

If the motor is subjected to an overload while it is running, or if some other abnormal condition occurs, the protective device 21 opens its contacts 24. Opening of the contacts 24 disconnects the motor terminal 6 from the supply line 7, causing the motor to stop. The deenergization of the winding 2 also interrupts the flow of current in the holding coil 11, so that this coil is deenergized and the contact 9 opens. When the protective device 21 has cooled sufficiently, the contacts 24 will reclose, but this does not cause the motor to restart since the motor circuit is open at the contact 9, and thus the motor cannot start after operation of the protective device 21 until the operator again actuates the start pushbutton 12.

Thus, the control system of Fig. 1 permits the elimination of the speed-responsive switch which was required in the usual arrangements of the prior art for starting and controlling single-phase motors, and results in a substantial decrease in cost as compared with the conventional arrangements. The new control system also makes it possible to utilize the automatically reset type of protective device in such applications as washing machine motors without involving the danger of having the motor restart unexpectedly after it has been stopped by operation of the protective device.

Fig. 2 shows a simplified embodiment of the invention which may be used to effect a further reduction in cost of the control equipment when the feature of preventing restarting of the motor after operation of the protective device is not required. In this embodiment of the invention, the relay 8 is entirely eliminated, so that neither a speed-responsive switch nor an external relay is utilized, and a very simple pushbutton control is provided.

The motor 1 and protective device 21 shown in Fig. 2 are similar to those described above in connection with Fig. 1, and the motor terminal 6 is connected to one side of the line 7 through the protective device 21 in the same manner. The opposite end of the main winding 2, however, is connected to a contact 25 which is carried on a movable arm 26. The arm 26 may be any type of movable contact-carrying member which is adapted to be moved between an open position, shown in the drawing, and a closed position in which the contact 25 engages a fixed contact 27, and which is also adapted to remain in either position until it is moved to the other. The fixed contact 27 is connected to the line 7. The arm 26 also carries another movable contact 28, and the movable contacts 25 and 28 are connected together, as by a conductor 29. A start pushbutton 30 is provided which is normally urged to its non-actuated position by a spring 31, or other suitable means. The pushbutton 30 carries a contact 32, which is positioned to engage the contact 28, and the auxiliary winding 3 of the motor 1 is connected to the contact 32.

In order to start the motor 1, the start pushbutton 30 is depressed. This causes the contact 32 to engage the contact 28, and also moves the arm 26 to its closed position with the contact 25 in engagement with the contact 27, connecting the windings 2 and 3 across the line. Thus, when the pushbutton 30 is depressed, both windings 2 and 3 are connected to the line substantially simultaneously and the motor starts. As soon as the pushbutton 30 is released, the contact 32 is separated from the contact 28 by the spring 31 to disconnect the auxiliary winding 3 from the line. Thus, the operation of this form of the invention in starting the motor is substantially the same as that of the embodiment of the invention shown in Fig. 1. After the arm 26 has been moved to its closed position, it remains in that position and the main winding 2 remains connected to the line so that the motor continues to run. A stop pushbutton 33 may be provided on the arm 26, and to stop the motor the pushbutton 33 is depressed to move the arm 26 to its open position with the contacts 25 and 27 separated. It will be understood that any suitable means may be provided for manually moving the arm 26 to separate the contacts 25 and 27 to cause the motor to stop.

The operation of the protective device 21 to disconnect the motor from the line on the occurrence of an overload or abnormal condition is the same as described above in connection with Fig. 1. In the arrangement of Fig. 2, however, reclosing of the contacts 24 will reconnect the winding 2 across the line, since the contacts 25 and 27 remain closed, and this is usually undesirable. For this reason, it may be preferable in many cases to utilize the manually reset type of protective device, in which the contacts 24 must be manually reclosed. In applications, such as washing machine motors, where the motor is relatively inaccessible, the manually reset protective device would have to be located at a point remote from the motor so as to be accessible, and thus complete protection against all types of abnormalities would not be obtainable, since the protective device would not be subjected to direct heating from the motor. For some applications, however, this is not a serious objection and the saving in cost over the embodiment of the invention shown in Fig. 1 by the elimination of the relay 8 would offset the fact that complete protection of the motor would not be obtained. In many cases, however, the motor can be mounted in a location where it is easily accessible, and the protective device can then be mounted on the motor in the usual manner and complete protection obtained. In such applications, the system of Fig. 2 is fully as effective as that of Fig. 1, but it is considerably cheaper because of the elimination of the relay 8.

It should now be apparent that in both embodiments of the invention described above, a simple pushbutton type of control system has been provided for single-phase motors, in which a substantial reduction in cost is effected over the systems that have previously been used because of the elimination of the centrifugal or other type of speed-responsive switch, which was incorporated in the motor in the conventional arrangements for starting and controlling single-phase motors. The new control system provides a simple and very inexpensive means for starting single-phase motors and it is readily adapted to any application of such motors, although it is particularly well suited for domestic appliances, such as washing machines and similar equipment because of its simplicity and ease of operation as well as its low cost.

Although certain specific embodiments of the invention have been shown and described for the purpose of illustration, it will be apparent that various changes and modifications may be made without departing from the spirit of the invention, and it is to be understood therefore that the invention is not limited to the particular arrangement shown but in its broadest aspects, it includes all equivalent modifications and embodiments which come within the scope of the appended claims.

I claim as my invention:

1. In combination, a single-phase electric motor having a main primary winding and an auxiliary primary winding, said windings being adapted to be connected to an electric supply line to be energized thereby, contact means for effecting connection of said main winding to the supply line, means for actuating said contact means to closed position to effect said connection of the main winding, holding means effective when energized to maintain said contact means in closed position, said holding means being energized in response to actuation of the contact means to closed position, said actuating means also effecting connection of said auxiliary winding to the supply line substantially simultaneously with the actuation of said contact means, said actuating means being adapted to maintain the connection of the auxiliary winding only while the motor is being started, and means for effecting deenergization of the holding means.

2. In combination, a single-phase electric motor having a main primary winding and an auxiliary primary winding, said windings being adapted to be connected to an electric supply line to be energized thereby, contact means for effecting connection of said main winding to the supply line, means for actuating said contact means to closed position to effect said connection of the main winding, a holding coil effective when energized to maintain said contact means in closed position, said holding coil being connected to said contact means so as to be energized when the contact means is in closed position, said actuating means also effecting connection of said auxiliary winding to the supply line substantially simultaneously with the actuation of said contact means, said actuating means being adapted to maintain the connection of the auxiliary winding only while the motor is being started, and means for effecting deenergization of the holding coil.

3. In combination, a single-phase electric motor having a main primary winding and an auxiliary primary winding, said windings being adapted to be connected to an electric supply line to be energized thereby, contact means for effecting connection of said main winding to the supply line, manually operable means for actuating said contact means to closed position to effect said connection of the main winding, a holding coil effective when energized to maintain said contact means in closed position, said holding coil being connected in series with said contact means and said main winding so as to be energized when the contact means is in closed position, said actuating means also having contacts which are effective when closed to effect connection of said auxiliary winding to the supply line, said last-mentioned contacts being closed upon operation of the actuating means and being adapted to remain closed only while the actuating means is being operated, and means for effecting deenergization of the holding coil.

4. In combination, a single-phase electric motor having a main primary winding and an auxiliary primary winding, said windings being adapted to be connected to an electric supply line to be energized thereby, contact means for effecting connection of said main winding to the supply line, means for actuating said contact means to closed position to effect said connection of the main winding, holding means effective when energized to maintain said contact means in closed position, said holding means being energized in response to actuation of the contact means to closed position, said actuating means also effecting connection of said auxiliary winding to the supply line substantially simultaneously with the actuation of said contact means, said actuating means being adapted to maintain the connection of the auxiliary winding only while the motor is being started, means for effecting deenergization of the holding means, and a protective device for the motor, said protective device operating in response to an abnormal condition of the motor to effect disconnection of said main winding from the supply line and deenergization of the holding means.

5. In combination, a single-phase electric motor having a main primary winding and an auxiliary primary winding, said windings being adapted to be connected to an electric supply line to be energized thereby, contact means for effecting connection of said main winding to the supply line, manually operable means for actuating said contact means to closed position to effect said connection of the main winding, a holding coil effective when energized to maintain said contact means in closed position, said holding coil being connected in series with said contact means and said main winding so as to be energized when the contact means is in closed position, said actuating means also having contacts which are effective when closed to effect connection of said auxiliary winding to the supply line, said last-mentioned contacts being closed upon operation of the actuating means and being adapted to remain closed only while the actuating means is being operated, means for effecting deenergization of the holding coil, and a thermally-responsive protective device for the motor, said protective device having contacts connected so that opening of the contacts effects deenergization of said main winding and also effects deenergization of said holding coil, said protective device being adapted to open its contacts in response to heating caused by excessive motor current and to reclose its contacts upon cooling.

6. In combination, a single-phase electric motor having a main primary winding and an auxiliary primary winding, said windings being adapted to be connected to an electric supply line to be energized thereby, first contact means for effecting connection of said main winding to the supply line, second contact means for effecting connection of said auxiliary winding to the supply line, common means for actuating both of said contact means to closed position to connect both windings to the line substantially simultaneously, means for returning said actuating means to the non-actuated position after actuation of the contact means, the actuating means effecting opening of the second contact means upon return to the non-actuated position, means independent of the actuating means for maintaining the first contact means in closed position, and other means for effecting opening of the first contact means.

7. In combination, a single-phase electric motor having a main primary winding and an auxiliary primary winding, said windings being adapted to be connected to an electric supply line to be energized thereby, first contact means for effecting connection of said main winding to the supply line, second contact means for effecting connection of said auxiliary winding to the supply line, common means for actuating both of said contact means to closed position to connect both windings to the line substantially simultaneously, means for returning said actuating means to the non-actuated position after actuation of the contact means, the actuating means effecting opening of the second contact means upon return to the non-actuated position, means independent of the actuating means for maintaining the first contact means in closed position, other means for effecting opening of the first contact means, and means responsive to an abnormal condition of the motor for disconnecting the motor from the line.

8. In combination, a single-phase electric motor having a main primary winding and an auxiliary primary winding, said windings being adapted to be connected to an electric supply line to be energized thereby, first contact means for effecting connection of said main winding to the supply line, second contact means for effecting connection of said auxiliary winding to the supply line, manually operable pushbutton means for actuating both of said contact means to closed position to connect both windings to the line substantially simultaneously, means urging said pushbutton means to non-actuated position, said second contact means being connected to the pushbutton means so as to be opened when the pushbutton means returns to its non-actuated position upon being released, means independent of the pushbutton means for maintaining the first contact means in closed position, and other pushbutton means for effecting opening of the first contact means.

9. In combination, a single-phase electric motor having a main primary winding and an auxiliary primary winding, said windings being adapted to be connected to an electric supply line to be energized thereby, first contact means for effecting connection of said main winding to the supply line, second contact means for effecting connection of said auxiliary winding to the supply line, manually operable pushbutton means for actuating both of said contact means to closed position to connect both windings to the line substantially simultaneously, means urging said pushbutton means to non-actuated position, said second contact means being connected to the pushbutton means so as to be opened when the pushbutton means returns to its non-actuated position upon being released, means independent of the pushbutton means for maintaining the first contact means in closed position, other pushbutton means for effecting opening of the first contact means, and means responsive to an abnormal condition of the motor for disconnecting the motor from the line.

HAROLD E. ELLIS.